C. W. ALBRECHT, Jr.
EMERGENCY AUTO TIRE.
APPLICATION FILED DEC. 1, 1917.
1,272,351. Patented July 16, 1918.
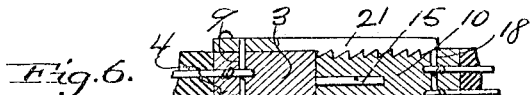
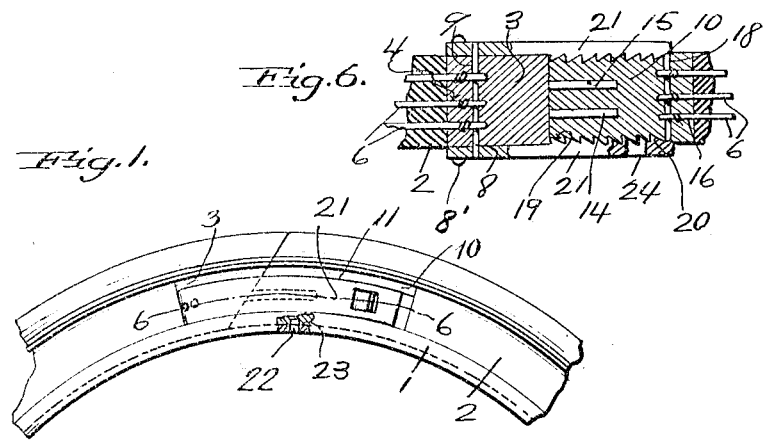
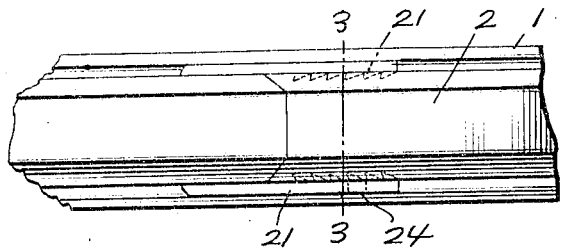
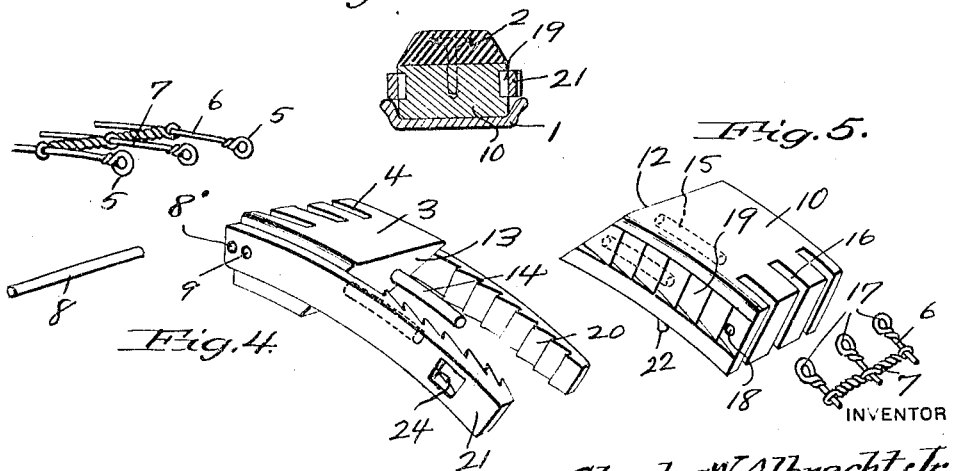
WITNESSES
G. Hennesy
Irving L. McCathen
INVENTOR
Charles W. Albrecht Jr.,
BY
Richard B. Owen,
ATTORNEY

UNITED STATES PATENT OFFICE.

CHARLES W. ALBRECHT, JR., OF SCHLEISINGERVILLE, WISCONSIN.

EMERGENCY AUTO-TIRE.

1,272,351.   Specification of Letters Patent.   Patented July 16, 1918.

Application filed December 1, 1917. Serial No. 204,861.

*To all whom it may concern:*

Be it known that I, CHARLES W. ALBRECHT, Jr., a citizen of the United States, residing at Schleisingerville, in the county of Washington and State of Wisconsin, have invented certain new and useful Improvements in Emergency Auto-Tires, of which the following is a specification.

This invention relates to an emergency automobile tire and has for its object the production of a simple and efficient means for quickly attaching the tire to the rim of a wheel.

Another object of this invention, is the production of a simple and efficient means for connecting the ends of the tire together.

With these and other objects in view the invention consists in the novel features, construction and arrangement of parts as will be hereinafter fully described and claimed.

In the drawings:—

Figure 1 is a side elevation of a portion of a tire showing the ends connected together.

Fig. 2 is a top plan view of the tire.

Fig. 3 is a section taken on line 3—3 of Fig. 2.

Fig. 4 is a detail perspective view of one of the tire connecting blocks a portion of the reinforcing wires being shown disconnected therefrom, the securing pin also being shown.

Fig. 5 is a detail perspective of one of the connecting blocks, a portion of the reinforcing wires being shown disconnected therefrom.

Fig. 6 is a section taken on line 6—6 of Fig. 1.

By referring to the drawings, it will be seen that 1 designates the rim of a wheel upon which is mounted the tire 2. The tire is preferably formed of solid rubber or other resilient material and a primary locking block 3 is secured to one end of the tire 2. This block 3 is provided with a plurality of notches 4 formed in the inner end thereof for the purpose of receiving the looped portions 5 of the reinforcing wires 6. These wires 6 are embedded within the resilient tire 2 and are connected and held in spaced relation by means of the transversely extending twisted wires 7. A securing pin 8 passes through the aperture 9 formed in the block 3 and also passes through the looped portions 5 of the reinforcing wires 6 for firmly holding the reinforcing wires 6 within the notches 4, and in engagement with the block 3.

A second block 10 is secured to the opposite end of the tire 2 by fitting within one of the notches 11 formed in the ends of the tire 2 and this block 10 is provided with a beveled outer end which beveled outer end is adapted to snugly engage the beveled face 13 of the block 3. This block 3 is provided with a plurality of projecting dowel pins 14 which pins extend into the apertures 15 formed in the block 10, these dowel pins 14 constituting an efficient means for holding the respective blocks 3 and 10 in proper alinement with each other. The block 10 is provided with a plurality of notches 16 upon the inner end thereof for the purpose of receiving the looped ends 17 of the reinforcing wires 6, these wires 6 extending throughout the entire body of the tire 2. A suitable pin similar to the pin 8 is extended through the aperture 18 formed in the block 10 for the purpose of connecting the wires 6 to the block 10.

The block 10 is provided with a plurality of teeth 19 upon each side thereof for the purpose of engaging the rack teeth 20 formed upon the inner face of the arms 21. These teeth 20 are adapted to interlock with the teeth 19 and firmly hold the respective ends of the tire 2 together. The arms 21 are formed of spring material and, for this reason, snugly adhere to the side faces of the block 10 for causing the teeth 19 and 20 to firmly interlock. The block 10 carries an anchoring pin 22 which anchoring pin is adapted to fit within the socket 23 formed in the rim 1 and anchor the block 10 against sliding movement on the rim 1, the block 3 being capable of sliding toward the block 10 for tightening the same together. An aperture 24 is formed in one side of one of the arms 21 and is adapted to receive the end of a tightening tool such as a screw driver or the like for prying the block 3 toward the block 10 and in this manner tightening the respective blocks together, the screw driver engaging the teeth 19.

From the foregoing description it will be seen that a very simple and efficient means has been produced for quickly attaching a tire to the rim of a wheel and firmly holding the same in engagement with the rim.

The arms 21 are anchored against upward and downward movement by means of a rivet 8' placed in the rear of the pin 9 to allow a maximum of resiliency for the arms 21.

What I claim is:—

1. A tire of the class described, comprising a body formed from one piece, a block carried by each end of said body, dowel pins carried by one of said blocks, the other block provided with sockets for receiving said dowel pins, said last mentioned block provided with locking teeth formed upon the sides thereof, the other block provided with projecting arms, and said arms provided with teeth engaging the teeth formed in said last mentioned block.

2. In combination with a rim, of a tire, a block carried by each end of said tire, one of said blocks provided with a depending pin, said rim provided with an aperture for receiving said pin, one of said blocks provided with teeth formed upon the sides thereof, spring arms carried by the other block, said spring arms provided with teeth upon their inner faces for engaging the teeth formed upon the outer faces of said first mentioned block, means for securing said blocks to the ends of said tire, and one of said arms provided with an aperture formed therein for receiving a tightening tool.

3. A tire comprising a one piece body formed of resilient material, a locking block carried by each end of said body, means for locking said blocks together, reinforcing wires extending circumferentially throughout said body, said blocks provided with notches formed upon their inner ends, said reinforcing wires provided with looped portions formed upon their respective ends and fitting within said notches, a securing pin carried by each block and passing through said looped portions, and transversely extending connecting wires secured to said longitudinally extending wires.

4. A tire comprising a body, connecting blocks carried by the respective ends of said body, teeth formed upon the sides of one block, spring arms carried by the other block, teeth formed upon said spring arms and engaging the teeth formed on the other block, one of said arms provided with a tool receiving aperture formed therein for permitting a tool to pass therethrough to engage the teeth formed in the first mentioned block for tightening one block relative to the other block.

5. A tire of the class described comprising a body, a connecting block secured to each end of said body, means for anchoring one of said connecting blocks in engagement with the wheel rim, and progressively adjustable means formed upon the respective blocks for permitting said blocks to be progressively adjusted with respect to each other for firmly tightening said tire upon the rim of a wheel.

6. A tire of the class described comprising a body, a connecting block secured to each end of said body, means for anchoring one of said connecting blocks in engagement with the wheel rim, progressively adjustable means formed upon the respective blocks for permitting said blocks to be progressively adjusted with respect to each other for firmly tightening said tire upon the rim of a wheel, and means carried by one block and engaging the other block for holding said blocks against lateral shifting movement with respect to each other.

In testimony whereof I affix my signature in presence of two witnesses.

CHARLES W. ALBRECHT, Jr.

Witnesses:
GEORGE C. NEHM,
E. W. ALBRECHT.